W. H. GOULD.
Dish-Drainers.

No. 141,643.

Patented August 12, 1873.

Witnesses.
H. L. Perrine.
A. H. Norris.

Inventor.
Warren H. Gould,
Per: James L. Norris.
Atty.

UNITED STATES PATENT OFFICE.

WARREN H. GOULD, OF MANCHESTER, NEW HAMPSHIRE.

IMPROVEMENT IN DISH-DRAINERS.

Specification forming part of Letters Patent No. 141,643, dated August 12, 1873; application filed June 14, 1873.

*To all whom it may concern:*

Be it known that I, WARREN H. GOULD, of Manchester, in the county of Hillsborough and State of New Hampshire, have invented certain new and useful Improvements in Dish-Drainer, of which the following is a specification:

The object of this invention is to furnish a simple and inexpensive device for attachment to dish-pans used for washing dishes, whereby the dishes may be drained and be in a comparatively dry state, when the drying is to be completed with a towel. To this end the invention consists of a frame, preferably composed of a series of U-shaped wires, connected at their ends by a wire band, which is so shaped and formed as to be readily attached to the upper edge of a dish-pan and supported thereon, so that as the dishes are washed they may be placed in the said wire frame and all water allowed to drip off into the pan.

Figure 1:
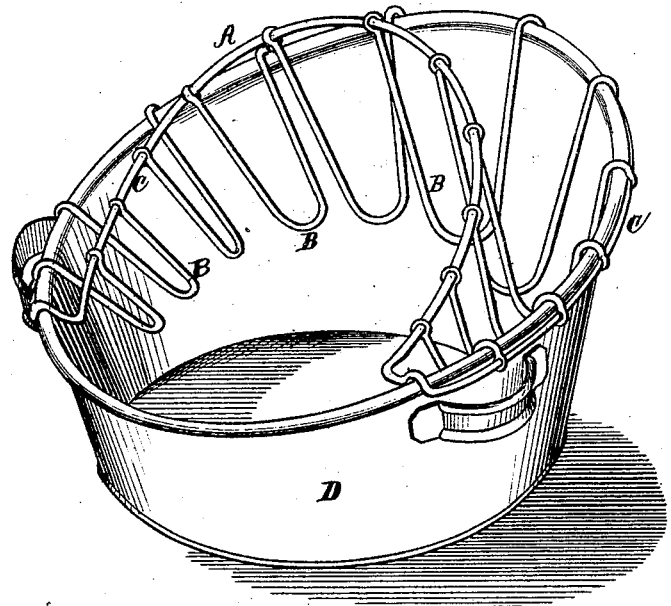
Figure 2:
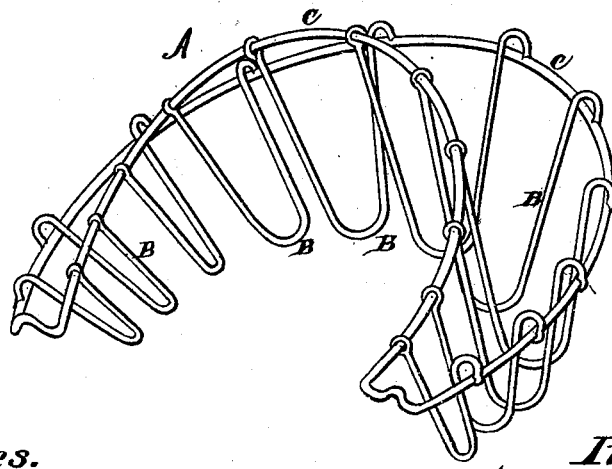

In the drawings, Figure 1 is a perspective view of a dish-pan with my improved drainer applied thereto; Fig. 2, a detached view of the drainer.

The letter A represents the dish-drainer attachment for wash-pans, and is composed of a series of U-shaped wires, B, attached, at their upper ends, to a supporting-band, C. The wires B and band C are so shaped as to conform to the shape of the pan D and to fit snugly on the upper edge of the same, as shown in Fig. 1, and thus be supported therein while in use, but readily detachable, if desired.

By this means as the dishes are washed in the pan they are placed on the frame A, and the water will drip off into the pan, whereby, when the towel is used to wipe the dishes, they are in a comparatively dry condition.

It is evident that the form of the frame may be modified without departing from my invention.

Having thus described my invention, I claim—

A dish-drainer attachment for wash-pans, consisting of a wire frame bent so as to be adapted to the vessel and extending over a part thereof, and which will permit the water to drip from the dishes when placed therein, substantially as and for the purpose described.

In testimony that I claim the foregoing I have hereunto set my hand this 5th day of June, 1873.

WARREN H. GOULD.

Witnesses:
R. H. PIKE,
C. N. HEALD.